United States Patent [19]

Brown

[11] 4,268,898

[45] May 19, 1981

[54] SEMICONDUCTOR SWITCHING CIRCUIT WITH CLAMPING AND ENERGY RECOVERY FEATURES

[75] Inventor: Harold J. Brown, Lorain, Ohio

[73] Assignee: Lorain Products Corporation, Lorain, Ohio

[21] Appl. No.: 132,173

[22] Filed: Mar. 20, 1980

[51] Int. Cl.³ .......................................... H02M 3/335
[52] U.S. Cl. ..................................... 363/20; 331/112; 363/56
[58] Field of Search ..................... 331/112; 363/18–21, 363/56; 361/159

[56] References Cited

U.S. PATENT DOCUMENTS

| | | | |
|---|---|---|---|
| 3,394,272 | 7/1968 | Fischman | 331/112 X |
| 3,408,536 | 10/1968 | Tibbs | 331/112 X |
| 3,417,306 | 12/1968 | Knak | 331/112 |
| 3,569,728 | 3/1971 | Atkins | 331/112 |
| 3,700,956 | 10/1972 | Cluett | 331/112 X |
| 3,909,747 | 9/1975 | Beierholm | 363/18 X |

OTHER PUBLICATIONS

Bassett, J. A., "A Biased Core DC–DC Converter", IEEE International Telecommunications Energy Conference, Record 1979, pp. 253–257.

Primary Examiner—William M. Shoop
Attorney, Agent, or Firm—Michael M. Rickin

[57] ABSTRACT

A circuit for holding the voltage across a rapidly switched semiconductor element such as a transistor used in an inductive circuit to substantially twice the voltage of an input source when the element is switched to its nonconducting state. Also included is circuitry for recovering and returning to the input source the energy stored in the inductance and wiring of the inductive circuit.

19 Claims, 2 Drawing Figures

SEMICONDUCTOR SWITCHING CIRCUIT WITH CLAMPING AND ENERGY RECOVERY FEATURES

BACKGROUND OF THE INVENTION

1. Field of the Invention

This invention relates to a control circuit for use in an inductive circuit wherein a semiconductor switching element is repetitively and rapidly switched between its conductive and non-conductive states to hold the voltage across the switching element to substantially twice the input voltage and in addition to recover and return to the input source the energy stored in the inductance and wiring of the inductive circuit.

2. Description of the Prior Art

Many applications exist for the use of rapid on/off switching of unidirectional current in an inductive circuit. Rapid alternate interruption and resumption of current causes problems of excessive power loss in the switching element, and the appearance of potentially damaging voltage transients across the switching element.

One such rapidly switched inductive circuit is a DC-DC converter such as the prior art converter shown in FIG. 1. The converter receives a DC input from a source and transmits substantially DC power to a load. DC to DC converters are useful for transforming the voltage level between the source and the load, and for providing electrical isolation of the load. This transforming and isolation capability is useful in providing DC power to DC logic circuitry, which requires a relatively low and stable DC input voltage.

Referring to FIG. 1, a DC to DC converter includes a primary circuit 50, a transformer 12 and a secondary or load circuit 52. The primary circuit 50 is coupled to a DC source 10 which provides power to the primary winding 18 of the transformer 12. A transistor switching element 20 is in series with the primary winding 18. The base of the transistor is coupled to a source 16 of a switching waveform which operates to drive the transistor rapidly between its conductive and nonconductive states. Typically the switching waveform is such as to drive the transistor 20 between its conductive and nonconductive states at a frequency of approximately 20 kilohertz.

The rapid on/off switching of the primary circuit 50 causes power having a net DC component to flow by induction through the transformer 12 to the secondary or load circuit 52. The power input to the secondary circuit flows through a rectifying diode 24 and a relatively large filtering inductor 26 to the DC load represented as 30. Capacitor 34 which is in shunt relationship to load 30 forms with conductor 26 a filter to provide the DC current to load 30. Another diode 28, sometimes referred to as a "free wheeling diode", is provided in parallel with the load to afford a return path for current induced by the filtering inductor 26 during periods of the switching cycle in which the primary current is interrupted.

Free wheeling diode 28 maintains current flow in inductor 26 during those periods of the switching cycle when transistor 20 is nonconductive. This maintenance of current flow in inductor 26 prevents the discharging and subsequent recharging of the inductor during the cycle. Diodes 24 and 28 cannot conduct simultaneously as such simultaneous conduction may result in a short circuit. One method for preventing simultaneous conduction of the diodes is by loosely coupling the primary and secondary windings of transformer 12. This loose coupling of the transformer windings controls the rate of change of current through free wheeling 28 so that its stored charge may be recovered before forward diode 24 conducts.

Energy is stored in the transformer leakage and shunt inductance and wiring of the DC to DC converter circuit during conduction of the transistor switch 20. Some of the energy stored in the shunt inductance is used to reverse the voltage across the winding to thereby reset the flux in transformer 12 when switching element 20 is nonconducting. Resetting of the transformer flux begins when transistor 20 switches from its conducting to nonconducting state.

Upon switching of the transistor from its conducting to nonconducting state potentially harmful voltage transients may occur across the transistor. Additionally in order to minimize the losses which occur upon the switching of transistor 20 from its conductive to nonconductive states and vice versa it is common to affect the making and breaking circuit switching operations with the maximum switching rates attainable. Fast opening and closure of the circuit reduces the time during which the switching element exhibits an intermediate impedance, i.e., between substantially infinity (open circuit) and substantially zero (closed circuit). Since most of the switching losses are caused by current flowing through the transistor while it exhibits this intermediate impedance, the minimization of the time during which this conduction obtains is considered essential. During the circuit opening, or "breaking" portion of the cycle the extremely fast switching operation aggravates switching loss and causes over voltage problems. With extremely fast switching a high rate of current decrease with respect to time causes the magnetic energy stored in the inductance of the transformer 12 to induce a large voltage transient across transistor 20. During this time, practically the entire voltage across the primary of the transformer 12 is applied to transistor 20, and this voltage is applied when the transistor is in its vulnerable intermediate impedance state and immediately succeeding that state.

Several approaches have been used in the past to limit the transient voltages and also minimize switching losses. One such approach is to reduce the inductance of the transformer primary and thereby reduce its troublesome stored magnetic energy. Reduction of the transformer primary inductance may avoid excessive voltage transients induced by the transformer primary leakage inductance during the turn off protion of the switching operation but a high transformer series inductance is desirable during turn on and in addition for preventing simultaneous conduction of the diodes 24 and 28.

Another approach involves the use of "snubbers" connected to the switched circuitry. One such example of a snubber circuit is shown in FIG. 1 wherein a series circuit comprising a capacitor 13 and a resistor 14 is connected in shunt relationship with transistor 20. This snubber circuit 32 functions in a manner such that on turn off of transistor 20 the voltage across the transistor is prevented from rising to a value which may be harmful to the transistor. During the period of time when transistor 20 is conducting the voltage across snubber capacitor 13 is essentially zero as the voltage across the transistor is essentially zero. When transistor 20 is turned off by the waveform generated from source 16 a current which results from the energy stored in the transformer inductance flows through snubber capacitor 13. Snubber resistor 14 is sized such that the voltage developed by the current does not exceed the voltage ratings of transistor 20. The time constant of snubber circuit 32 is related to the size of the leakage inductance of the transformer. When the leakage inductance of the transformer is large a relatively large snubber capacitor is needed.

One drawback associated with snubber circuit 32 is that while this snubber circuit is desirable for limiting transients during turn off of transistor 20 it is not desirable during turn on of the transistor. During turn on the snubber capacitor 13 is charged. As the voltage across transistor 20 when it conducts is essentially zero, the energy stored in the snubber capacitor 13 must be dissipated in snubber resistor 14. Even during turn off the snubber capacitor is charged through snubber resistor 14 resulting in losses occurring in that resistor. It is therefore seen that while snubber circuit 32 may result during turn off in a decrease of transient voltages and an improvement of circuit efficiency resulting from a reduction of switching losses the energy dissipated in snubber resistor 14 during turn on and turn off may well counteract the improved efficiency.

Another problem associated with the use of snubbers is exhibited where a relatively light load is driven by the converter. Under light loads waveform alternations caused by the use of snubbers can interfere with the stability and precise control of the output voltage and power. This is because, at light loads, the snubber induced waveform changes become significant with respect to the waveform of power actually transferred by the converter to the load.

Snubbers also contribute to undesirable "device sensitivity" of their associated circuitry. Device sensitivity is that sensitivity which performance of a circuit exhibits with respect to small variations in the properties or characteristics among replacement semiconductor and other circuit elements which are nominally identical. The effectiveness of the snubbers may be affected by the mere exchange of one circuit element for another nominally identical element as minor variations in circuit elements influence transient waveforms. Snubbers depend for their effectiveness upon the modification of such transient waveforms.

The use of any snubber circuitry entails a compromised design between improving circuit performance on the making of the circuit, and on the breaking operation. To improve circuit making performance entails some sacrifice of breaking performance, and vice versa.

Another circuit for holding the voltage across the transistor switch of a DC to DC converter to a predetermined magnitude during turn off of the switch is described in a paper by J. A. Bassett entitled "A Biased Core DC-DC Converter" which has been published in the IEEE International Telecommmunications Energy Conference (INTELEC) Record 1979, pages 253–257. This circuit utilizes an energy recovery winding which provides extremely close coupling to the primary winding of a main transformer constructed from a toroid.

Toroidal construction has certain disadvantages as compared to main transformers which are constructed from regular coils and ferrite cores. In particular toroids are harder and more expensive to wind than regular cores and for dc-dc converters designed to produce large amounts of output power the toroids, due to the wire size involved, may have to be wound by hand. Further toroids as shown in FIG. 4 of the above paper are usually potted in order to present a more aesthetically pleasing appearance to the end user of the converter circuit. It is therefore desirable to construct a dc to dc converter circuit which limits the voltage across the transistor switch during turn off as well as recovers the energy stored in the circuit inductance and yet utilizes a transformer which can be simply and inexpensively constructed from regular coils and cores.

In accordance with the present invention there is provided circuitry which limits the voltage across the transistor switch on turn off to substantially twice the voltage of the d-c source and also recovers and returns to that source energy stored in the circuit inductance without the necessity of using a main transformer design which involves complexity and expense in construction.

SUMMARY OF THE INVENTION

According to the present invention, an inductive circuit having a semiconductor switching element which alternates between conductive and nonconductive states includes circuitry to hold the voltage across the switching element to twice the voltage of an input source when the switching element changes from its conductive to nonconductive state. The switching element is coupled to the input source. The voltage across the switch is held clamped to twice the input voltage until the energy stored in the circuit inductance transfers.

Also included is an energy recovery circuit for recovering the energy stored in the circuit inductance when the switch becomes non-conductive. The energy recovery circuit is inductively coupled to the circuit inductance and the recovered energy is returned to the input source.

DESCRIPTION OF THE PREFERRED EMBODIMENT

Figure 1:
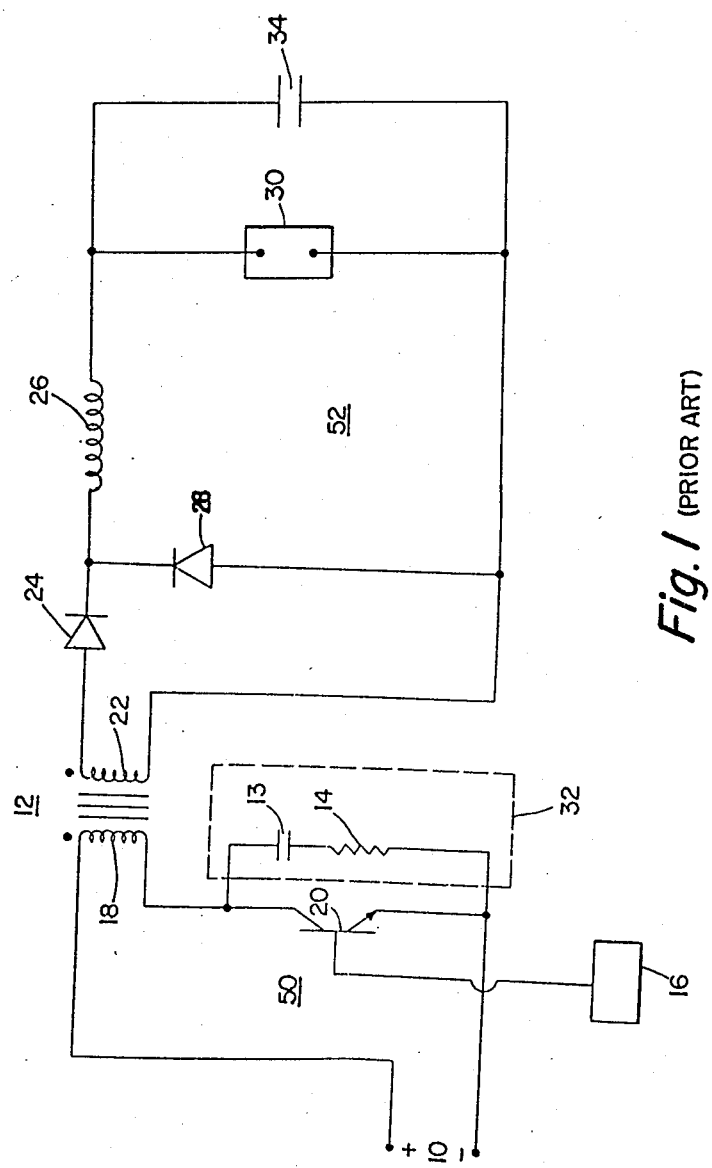
FIG. 1 is a schematic diagram illustrating an example of a prior art d-c to d-c converter circuitry.
Figure 2:
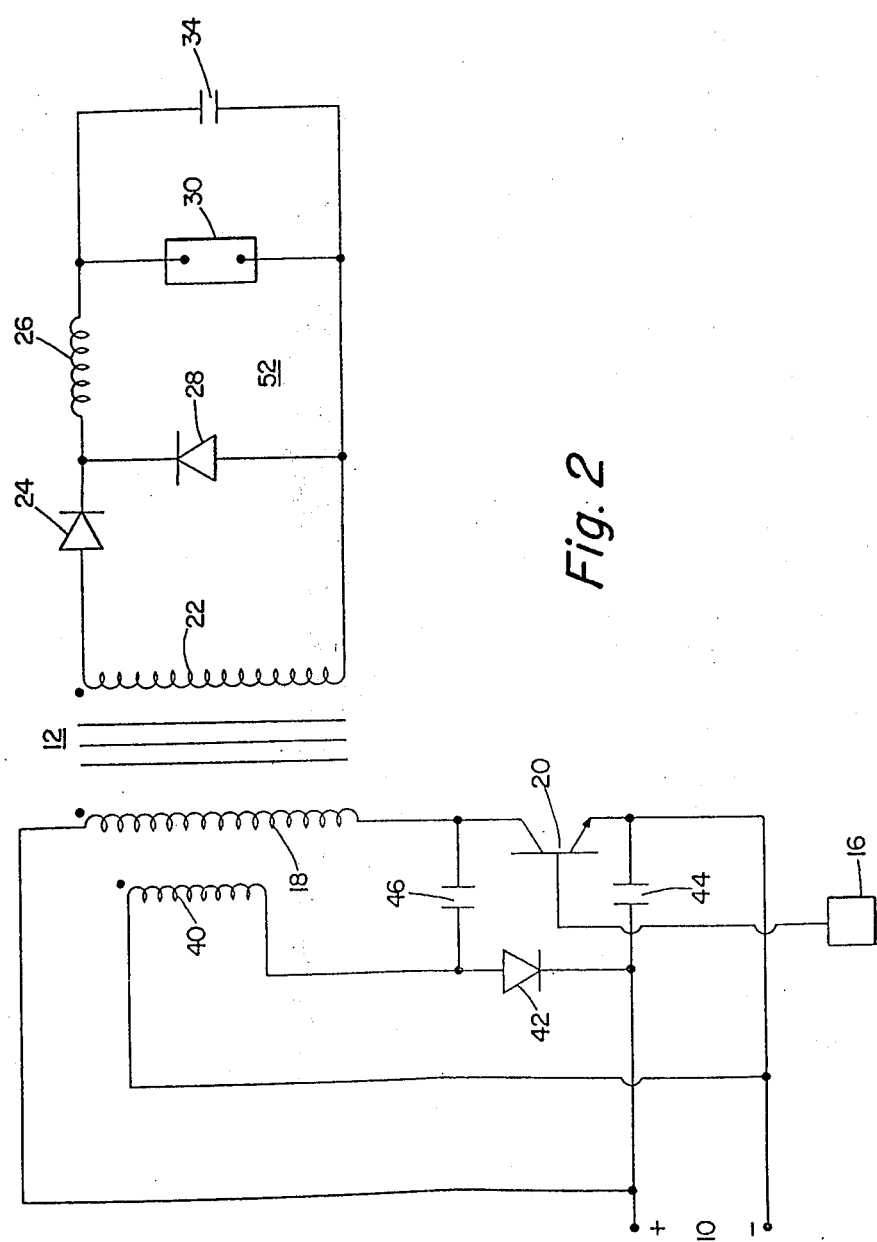
FIG. 2 is a schematic diagram illustrating a d-c to d-c converter circuit which incorporates the clamping and energy recovery circuitry embodying the present invention.

Referring to FIG. 2 there is shown a DC to DC converter circuit incorporating an embodiment of the present invention. The converter of FIG. 2 is similar in many respects to the converter of FIG. 1 and corresponding elements are similarly numbered. The converter of FIG. 2 differs from that of FIG. 1 primarily in that the converter of FIG. 2 includes circuitry which allows the converter to limit or clamp the voltage across the semiconductor switching element to a substantially fixed value when the element switches from its conductive to nonconductive states and further includes circuitry for recovering and returning to the input source a substantial portion of the energy stored in the inductor and wiring inductance of the circuit.

When transistor 20 switches from its conductive to nonconductive state the voltage across the transistor is clamped to a value which is substantially equal to twice the voltage of input source 10. The clamping action is provided by the circuit comprising diode 42 and capacitors 44 and 46. Capacitor 44 has one end connected to the emitter of transistor 20. Capacitor 46 has one end connected to the junction of the collector of transistor 20 and the nondotted end of primary winding 18. The other ends of capacitors 44 and 46 are connected, respectively, to the cathode and anode of diode 42.

An auxiliary winding 40 useful for energy recovery as will be explained hereinafter is provided. Winding 40 is wound in the same sense, as indicated by the dots, as primary winding 18 and secondary winding 22 of transformer 12. Winding 40 also has the same number of turns as primary winding 18. Winding 40 is positioned to be preferably in a closely coupled inductive relationship to primary winding 18. The closely coupled inductive relationship between the windings may be achieved by winding primary 18 and auxiliary 40 as a twisted pair. The dotted end of winding 40 is connected to the junction of the emitter of transistor 20 and the side of capacitor 44 connected thereto. These connections provide a return path to the negative side of input source 10. The nondotted end of winding 40 is connected to the junction of the anode of diode 42 and the side of capacitor 46 connected thereto As described previously for the converter of FIG. 1 the base of transistor 20 is connected to a switching signal generator 16. The switching generator 16 in known fashion produces a suitable switching waveform for switching the transistor 20 between its conductive and non-conductive states at a frequency of approximately 20 kilohertz. The duty cycle of the switching signal waveform may vary from zero to 50 percent depending on the load.

With transistor 20 conducting, voltages are developed on primary winding 18 and auxiliary winding 40. If the number of turns in both windings are identical and if as shown in FIG. 2 by the dots the two windings are in phase then, with transistor 20 conducting, equal voltages will appear on both windings. As the voltage across transistor 20 when it is conducting is small the voltage appearing on the windings will be substantially equal to the voltage of source 10. By the principle of superposition the voltages appearing across capacitors 44 and 46 when transistor 20 conducts will also be substantially equal to the voltage of source 10.

DC current flows from the positive terminal of source 10 through winding 18 and transistor 20 back to the negative terminal of source 10. As a result of this current flow energy is stored in the leakage and shunt inductance of the primary winding of the transformer. Diode 42 is non-conducting and therefore no DC current flows through auxiliary winding 40. Thus, during the on period of transistor 20 current is flowing through primary winding 18 thereby resulting in energy being stored in the leakage and shunt inductance of that winding.

When the switching waveform produced by generator 16 switches between conduction and non-conduction transistor 20 will be turned off. At the instant of turn off because of the inductance of primary winding 18 current will still continue to flow through that winding. Transistor 20 is however chosen such that during turn off the current through the transistor falls rapidly. The selection of a transistor having a rapid turn off characteristic increases the efficiency of the DC to DC converter. Thus, as a result of the rapid turn off of transistor 20 the current flowing through primary winding 18 at turn off cannot flow through the transistor.

Current flowing in the primary winding must then find an alternate return path to source 10. This alternate path is found through capacitor 46 and diode 42. As a result of this flow of current the voltage on capacitor 46 begins to increase and thereby become greater in magnitude than the voltage on capacitor 44. This increase in voltage on capacitor 46 causes current to begin to flow between primary winding 18 and auxiliary winding 40. Just prior to the instant of turn off the loop consisting of capacitors 44 and 46 and primary winding 18 and auxiliary winding 40 is balanced. Thus in the absence of any increase in voltage on capacitor 46 there will be no current flow between the transformer's primary winding and the auxiliary winding.

As described above during turn off a surge of current will occur in the loop consisting of capacitors 44, 46 and diode 42. As a result of leakage inductance in this loop a surge of voltage will also occur. The smaller the value that the leakage inductance of this loop has the less will be the surge of voltage. To minimize the leakage inductance elements 42, 44 and 46 are preferably geometrically arranged so as to be tightly coupled.

As the voltage of capacitor 46 rises to be larger in magnitude than the voltage of capacitor 44 linking occurs between primary winding 18 and auxiliary winding 40. Additionally as a result of capacitors 44 and 46 the voltage across transistor 20 is held during turn off to be approximately equal to twice the voltage of source 10. This clamping of the voltage across transistor 20 to a value which is well within the transistors rating will continue until all of the energy stored in the inductance of primary winding 18 during conduction of transistor 20 is removed. Thus during turn off of transistor 20 the circuit consisting of diode 42 and capacitors 44 and 46 provide both a clamping action which prevents potentially harmful transients from appearing across the transistor when it is not conducting and a linking of primary winding 18 and auxiliary winding 40 such that the energy stored in the primary winding may be removed.

The amount by which the voltage on capacitor 46 will rise upon turn off of the transistor depends upon the size of the capacitor. As the capacitance of capacitor 46 increases the rise in voltage on that capacitor will not be as large as compared to the rise in voltage that would occur from a smaller value of capacitance. As the value of the capacitance increases the LC time constant and therefore the time it takes for the voltage on the capacitor to rise increases thereby limiting the voltage rise on the capacitor before primary winding 18 and auxiliary winding 40 link. Typically the voltage on capacitor 46 rises by approximately 2% upon turn off of transistor 20.

Upon the linking of primary winding 18 and auxiliary or energy recovery winding 40 a DC path will appear through the windings for capacitor 46 to discharge. The voltage on capacitor 46 will therefore decrease to the value it had just before transistor 20 turned off.

The linking of primary winding 18 and energy recovery winding 40 allows the energy remaining in primary winding 18 to be intercepted by winding 40. The intercepted energy is then returned through diode 42 to source 10 to thereby increase the efficiency of the converter.

It should be appreciated that the function of capacitor 46 is such that on turn off of transistor 20 the voltage across the transistor is clamped to a value which is twice the voltage of the DC source. The clamping action prevents a large and potentially harmful voltage transient from occurring across the transistor when it is nonconducting. The protection of the nonconducting transistor against large transient voltages is accomplished without the use of a snubber circuit. Further the protection of the transistor is accomplished in a manner such that the energy stored in the circuit inductance may be recovered and returned to the input source to thereby increase converter circuit efficiency. Thus the use of snubber circuits to protect the transistor on turn off, which would result in the loss rather than recovery of the stored energy, is avoided.

Representative values and names of manufacturers where applicable for various ones of the components of the circuit of FIG. 2 for a dc to dc converter having an output voltage of 24 volts and an output current of 10 amperes are listed below:

Capacitor 44=1000 microfarad-Sprague 674D
Capacitor 46=20 microfarad-Sprague 672D
Capacitor 34=2900 microfarad-Sprague 674D
Diode 42—Motorola 1N 4723
Diodes 24 and 28—Varo R714X The transformer had a primary winding 18 of 8 turns and a secondary winding 22 of 12 turns. The auxiliary or energy recovery winding 40 had 8 turns.

It is to be understood that the description of this preferred embodiment is intended to be only illustrative, rather than exhaustive, of the present invention. Those of ordinary skill will be able to make certain additions, deletions, and/or modifications to embodiments of the disclosed subject matter without departing from the spirit of the invention or its scope, as defined by the appended claims.

What is claimed is:

1. In a circuit of the type including a semiconductor switching means coupled to source of input voltage and to an inductive energy storage means said switching means responsive to a source of periodic switching signals to thereby switch between conductive and non-conductive states said inductive means storing energy when said switching means is in said conductive state, the improvement therein comprising:
    (a) means responsive to the change of said switching means from said conductive to said non-conductive state for maintaining the voltage across said switching means at a magnitude which is approximately euqql to twice the voltage of said input source until the energy stored in said inductive means is recovered; and
    (b) energy recovery means connected to said voltage maintaining means and said input source and inductively coupled to said inductive storing means for recovering the energy stored in said inductive means when said switching means becomes non-conductive, said energy recovery means including means for returning said recovered energy to said input source.

2. The circuit of claim 1 wherein said semiconductor switching means includes first, second and third electrodes said source of periodic switching signals being coupled to said first electrode and wherein said voltage maintaining means comprises:
    (a) first charge storage means connected to said second electrode;
    (b) second charge storage means connected to said third electrode; and
    (c) diode means for coupling said first and second charge storage means to each other.

3. The circuit of claim 2 wherein said inductive energy storage means includes a transformer having primary and secondary windings said primary winding being coupled between said second electrode and said input source and said energy recovery means further includes inductive means which is tightly coupled to said transformer primary.

4. The circuit of claim 1 wherein said switching means is a transistor having base, emitter and collector electrodes said base electrode being connected to said source of switching signals and wherein said voltage maintaining means comprises:
    (a) a first capacitor connected to said collector electrode;
    (b) a second capacitor connected to said emitter electrode; and
    (c) a diode connecting said first and second capacitors to each other.

5. The circuit of claim 4 wherein said inductive energy storage means includes a transformer having a primary winding and a secondary winding said primary winding being connected between said input source and said collector electrode and wherein said energy recovery means further includes inductive means which is tightly coupled to said transformer primary winding.

6. The circuit of claim 5 wherein said inductive energy recovery means and said transformer primary winding are wound as a twisted pair.

7. A circuit comprising:
    (a) an input source;
    (b) inductive energy storing means;
    (c) semiconductor switching means coupled to said input source and to said inductive energy storing means said switching means responsive to a source of periodic switching signals to thereby switch between conductive and nonconductive states said inductive means storing energy when said switching means is in said conductive state;
    (d) means responsive to the switching of said switching means from said conductive to said non-conductive state for maintaining the voltage across said switching means at a magnitude which is approximately equal to twice the voltage of said input source said voltage value being maintained until the energy stored in said inductive means is recovered; and
    (e) energy recovery means connected to said voltage maintaining means and said input source and inductively coupled to said inductive energy storing means for recovering when said semiconductor switching means becomes non-conductive the energy stored in said inductive storing means said recovery means including means for returning said recovered energy to said input source.

8. The circuit of claim 7 wherein said semiconductor switching means includes first, second and third electrodes said source of periodic switching signals being coupled to said first electrode and wherein said voltage maintaining means comprises:
    (a) first charged storage means connected to said second electrode;
    (b) second charge storage means connected to said third electrode; and
    (c) diode means for coupling said first and second charge storage means to each other.

9. The circuit of claim 8 wherein said inductive energy storage means includes a transformer having primary and secondary windings said primary winding being coupled between said second electrode and said input source and said energy recovery means further includes inductive means which is tightly coupled to said transformer primary.

10. The circuit of claim 7 wherein said switching means is a transistor having base, emitter and collector electrodes said base electrode being connected to said source of switching signals and wherein said voltage maintaining means comprises:
   (a) a first capacitor connected to said collector electrode;
   (b) a second capacitor connected to said emitter electrode; and
   (c) a diode connecting said first and second capacitors to each other.

11. The circuit of claim 10 wherein said inductive energy storage means includes a transformer having a primary winding and a secondary winding said primary winding being connected between said input source and said collector electrode and wherein said energy recovery means further includes inductive means which is tightly coupled to said transformer primary winding.

12. The circuit of claim 11 wherein said inductive energy recovery means and said transformer primary winding are wound as a twisted pair.

13. A DC to DC converter comprising:
   (a) a switching means having an input responsive to a source of switching signals to thereby alternate between conductive and nonconductive states;
   (b) a transformer having primary and secondary windings said primary winding being coupled to said switching means;
   (c) a DC source coupled to the input of said switching means;
   (d) rectifying and filtering circuit means connected to the secondary winding of said transformer to thereby develop a DC output voltage;
   (e) means responsive to the alternation of said switching means from said conductive to said non-conductive state for maintaining the voltage across said switching means at a magnitude which is approximately equal to twice the voltage of said DC source said voltage being maintained until the magnitude energy stored in said transformer is recovered;
   (f) energy recovered means connected to said voltage maintaining means and said DC source and inductively coupled to the primary of said transformer for recovering when said switching means switches from said conductive to said non-conductive state the magnetic energy stored in said transformer; and
   (g) means includes in said energy recovery circuit for returning said recovered energy to said DC source.

14. The circuit of claim 13 wherein said switching means includes first, second and third electrodes said source of periodic switching signals being coupled to said first electrode and wherein said voltage maintaining means comprises:
   (a) first charged storage means connected to said second electrode;
   (b) second charge storage means connected to said third electrode; and
   (c) diode means for coupling said first and second charge storage means to each other.

15. The circuit of claim 14 wherein said primary winding is coupled between said second electrode and said input source and said energy recovery means further includes inductive means which is tightly coupled to said transformer primary.

16. The circuit of claim 13 wherein said switching means is a transistor having base, emitter and collector electrodes said base electrode being connected to said source of switching signals and wherein said voltage maintaining means comprises:
   (a) a first capacitor connected to said collector electrode;
   (b) a second capacitor connected to said emitter electrode; and
   (c) a diode connecting said first and second capacitors to each other.

17. The circuit of claim 16 wherein said primary winding is connected between said input source and said collector electrode and wherein said energy recovery means further includes inductive means which is tightly coupled to said transformer primary winding.

18. The circuit of claim 17 wherein said inductive energy recovery means and said transformer primary winding are wound as a twisted pair.

19. A DC-DC converter circuit comprising:
   (a) a primary circuit including a transformer having a primary winding, a semiconductor switching element having at least two electrodes in series with said primary winding and terminals for coupling the primary circuit to a source of DC voltage, said switching element having one electrode connected to the primary winding and the other electrode connected to the negative source terminal;
   (b) a secondary circuit including a secondary winding of said transformer, a filtering inductance in series with the transformer secondary winding, terminals for coupling the secondary circuit to a DC load, and diode circuitry interposed between the secondary winding and the filtering inductance;
   (c) means for rapidly switching the semiconductor switching element between conductive and non-conductive states for alternately interrupting and resuming unidirectional current flow in the primary circuit; and
   (d) circuitry for limiting the voltage across the semiconductor switching element in response to the alternation of said switching element from said conductive to said non-conductive state and for recovering the energy stored in the primary winding, said circuitry including:
      (i) circuitry for maintaining the voltage across said switching element at a magnitude which is approximately equal to twice the voltage of said DC source said voltage being maintained until the magnetic energy stored in said transformer is recovered; and
      (ii) an energy recovery winding connected to said voltage maintaining means and said DC source and inductively coupled to the primary winding for recovering the energy stored in said transformer and returning said recovered energy to said DC source.

* * * * *